United States Patent
Kumar et al.

(10) Patent No.: US 11,570,588 B2
(45) Date of Patent: Jan. 31, 2023

(54) SMS ENHANCEMENT FOR NEW RADIO (71) Applicant: Apple Inc., Cupertino, CA (US)

(72) Inventors: Utkarsh Kumar, Fremont, CA (US); Srinivasan Nimmala, San Jose, CA (US); Vijay Venkataraman, San Jose, CA (US); Yifan Zhu, San Jose, CA (US); Lakshmi N. Kavuri, Cupertino, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 16/949,498

(22) Filed: Oct. 30, 2020

(65) Prior Publication Data
US 2021/0136536 A1 May 6, 2021

Related U.S. Application Data

(60) Provisional application No. 62/929,434, filed on Nov. 1, 2019.

(51) Int. Cl.
| | |
|---|---|
| *H04W 4/14* | (2009.01) |
| *H04L 65/1016* | (2022.01) |
| *H04L 65/1073* | (2022.01) |
| *H04W 8/04* | (2009.01) |
| *H04W 8/22* | (2009.01) |
| *H04W 28/04* | (2009.01) |

(Continued)

(52) U.S. Cl.
CPC ........... *H04W 4/14* (2013.01); *H04L 65/1016* (2013.01); *H04L 65/1073* (2013.01); *H04L 65/1104* (2022.05); *H04W 8/04* (2013.01); *H04W 8/22* (2013.01); *H04W 28/04* (2013.01); *H04W 88/184* (2013.01)

(58) Field of Classification Search
CPC . H04L 51/12; H04L 65/1006; H04L 65/1073; H04W 4/14; H04W 8/02–06; H04W 8/22–24; H04W 88/18; H04W 88/184; H04W 60/00
See application file for complete search history.

(56) References Cited

U.S. PATENT DOCUMENTS

| | | | |
|---|---|---|---|
| 5,903,726 A | 5/1999 | Donovan et al. | |
| 2007/0174443 A1* | 7/2007 | Shaheen | H04W 8/06 713/168 |

(Continued)

FOREIGN PATENT DOCUMENTS

| | | |
|---|---|---|
| CN | 101237337 | 8/2008 |
| CN | 107872771 | 4/2018 |

*Primary Examiner* — Ronald Eisner
(74) *Attorney, Agent, or Firm* — Fay Kaplun & Marcin, LLP (57) ABSTRACT

A user equipment (UE) indicates to a network the types of SMS messages that the UE does not support. The network receives an indication from the UE corresponding to one or more types of short message service (SMS) messages that are supported by the UE, receives a SMS that is intended to be delivered to the UE, determines whether to forward the SMS message to the UE based on the indication received from the UE, when the SMS message is a type of SMS message supported by the UE, forwards the SMS message to the UE and, when the SMS message is not a type of SMS message supported by the UE, discards the SMS message.

13 Claims, 4 Drawing Sheets

(51) Int. Cl.
  *H04L 65/1104*     (2022.01)
  *H04W 88/18*       (2009.01)

(56) References Cited

U.S. PATENT DOCUMENTS

| | | | | |
|---|---|---|---|---|
| 2009/0325615 | A1* | 12/2009 | McKay | H04W 4/14 |
| | | | | 455/466 |
| 2014/0133399 | A1* | 5/2014 | Kim | H04W 4/14 |
| | | | | 370/328 |
| 2014/0235283 | A1* | 8/2014 | Jain | H04L 5/0048 |
| | | | | 455/466 |
| 2017/0332217 | A1* | 11/2017 | Youtz | H04W 64/00 |
| 2018/0077112 | A1* | 3/2018 | Zhou | H04W 76/14 |
| 2018/0139762 | A1 | 5/2018 | Cho et al. | |
| 2019/0223245 | A1 | 7/2019 | Shu et al. | |

* cited by examiner

| 8 | 7 | 6 | 5 | 4 | 3 | 2 | 1 | Octets |
|---|---|---|---|---|---|---|---|---|
| IEI 402 | | | | | | | | |
| | | | UDH Idicator 404 | Class 3 Idicator 406 | Class 2 Idicator 408 | Class 1 Idicator 410 | Class 0 Idicator 412 | |

Fig. 4

SMS ENHANCEMENT FOR NEW RADIO

PRIORITY CLAIM/INCORPORATION BY REFERENCE

This application claims priority to U.S. Provisional Application Ser. No. 62/929,434, entitled "SMS Enhancement for New Radio," filed Nov. 1, 2019, the entirety of which is incorporated by reference herein.

BACKGROUND

A user equipment (UE) may establish a connection to at least one of multiple different networks or types of networks. When connected, the UE may receive a short message service (SMS) message. However, the UE may not support every type of SMS message. Delivering a type of SMS message that the UE does not support is an inefficient use of both UE and network resources.

SUMMARY

Some exemplary embodiments are related to a user equipment (UE) having a transceiver configured to communicate with a network and a processor communicatively coupled to the transceiver and configured to perform operations. The operations include registering with the network and transmitting, to the network, an indication of one or more types of short message service (SMS) messages that are not supported by the UE.

Other exemplary embodiments are related to a processor configured to perform operations. The operations include registering with a network and transmitting, to the network, an indication of one or more types of short message service (SMS) messages that are not supported by the UE.

Still further exemplary embodiments are related to a method performed by a network component. The method includes receiving an indication from a user equipment (UE) corresponding to one or more types of short message service (SMS) messages that are supported by the UE, receiving a SMS that is intended to be delivered to the UE, determining whether to forward the SMS message to the UE based on the indication received from the UE, when the SMS message is a type of SMS message supported by the UE, forwarding the SMS message to the UE and when the SMS message is not a type of SMS message supported by the UE, discarding the SMS message.

DETAILED DESCRIPTION

The exemplary embodiments may be further understood with reference to the following description and the related appended drawings, wherein like elements are provided with the same reference numerals. The exemplary embodiments describe devices, systems and methods for implementing a mechanism that is configured to prevent a user equipment (UE) from receiving a type of short message service (SMS) message that the UE does not support. As will be described below, the exemplary embodiments provide power saving benefits to the UE and improves the efficiency with which network resources may be utilized.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to different types of SMS messages. Throughout this description, a "type of SMS message" refers to any SMS message that may be characterized based on the information included in the SMS message, how the SMS message is configured to be processed when received and/or the intended purpose of the SMS message. Any reference to an SMS message characterized based on a particular aspect is only provided for illustrative purposes and is not intended to limit the scope of the term "type of SMS message."

A person of ordinary skill in the art would understand that there are four classes of SMS messages, e.g., class 0, class 1, class 2 and class 3. A class 0 SMS message is only stored by the UE or its subscriber identity module (SIM) in response to user input. A class 1 SMS message is autonomously stored by the UE or its SIM. A class 2 SMS carries SIM related data. A class 3 SMS message is to be forwarded by the UE to an external device. Throughout this description, each SMS message class may represent a different type of SMS message.

Another type of SMS message may be an SMS message configured with a user data header (UDH). The UDH may include information that may indicate how the SMS message is to be formatted and/or processed by the UE. Another type of SMS message may be a wireless application protocol (WAP) push message. The WAP push message may refer to a SMS message configured to cause the UE to display a multimedia message (MMS) or other mechanism. In addition, there may be proprietary UDH fields that may differentiate an SMS type at the UE.

A single SMS message may be characterized as more than one type of SMS message. Thus, any reference to a SMS message being a particular type of SMS message does not limit that SMS message to being characterized as only that type of SMS message. Further, the scope of the term "type of SMS message" is not limited to the SMS messages described herein. As mentioned above, a "type of SMS message" may refer to any SMS message that may be characterized based on the information included within the SMS message, how the SMS message is to be processed when received and/or the intended purpose of the SMS message.

The UE may not support each type of SMS message. Conventionally, when the UE receives a type of SMS message the UE does not support, the SMS message is processed by various protocol stack layers. Subsequently, when the UE determines that the SMS message is not supported, the SMS message may be discarded. The network is unaware that the UE does not support this type of SMS message. As a result, the network may retransmit the SMS message to the UE. Again, the SMS message is processed by various protocol stack layers of the UE until the message is discarded. This process may be repeated several times wasting the resources of both the UE and the network. In some cases, the UE may send an RP-ERROR to the network indicating the SMS could not (or would not) be processed, but that does not prevent another SMS of similar type being received in the future.

A type of SMS message the UE does not support may also pose a security issue. For example, the process described above may be leveraged by a malicious entity to cause a denial of service (DoS) at the UE. This may prevent a user from accessing the UE or may prevent the UE from performing other operations.

On the UE side, processing a SMS message has a certain power cost. When an unsupported SMS message is processed, this is an inefficient use of the UE's limited power supply. On the network side, retransmitting a type of SMS that is not supported by the UE causes unnecessary traffic and is inefficient use of network resources.

The exemplary embodiments relate to indicating to the network the types of SMS messages that are supported by the UE. Various techniques for providing this indication to the network will be described below. Subsequently, the network may utilize this indication to prevent the UE from receiving a type of SMS message the UE does not support. As a result, the UE may avoid the power drain associated with processing an unsupported SMS message and the network may avoid utilizing network resources to deliver an unsupported SMS message to the UE.

Figure 1:
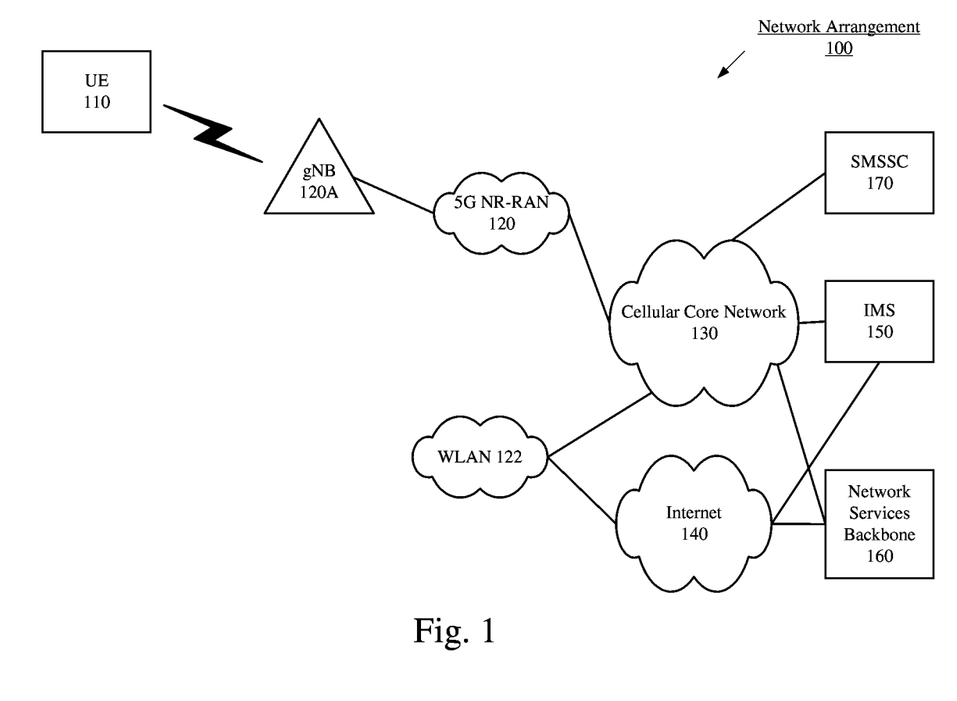
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120 and a wireless local access network (WLAN) 122. However, it should be understood that the UE 110 may also communicate with other types of networks and the UE 110 may also communicate with networks over a wired connection. Therefore, the UE 110 may include a 5G NR chipset to communicate with the 5G NR-RAN 120 and an ISM chipset to communicate with the WLAN 122.

The 5G NR-RAN 120 may be a portion of a cellular network that may be deployed by cellular providers (e.g., Verizon, AT&T, T-Mobile, etc.). The networks 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR-RAN via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120). Reference to the 5G NR-RAN 120 is provided for illustrative purposes and any type of network may be used. For example, the UE 110 may also connect to an LTE RAN (not pictured) or a Legacy RAN (not pictured).

In addition to the networks 120 and 122 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include a SMS service center (SMSSC) 170. The SMSSC 170 is a network component that manages the flow of SMS messages within the network. For example, the SMSSC 170 may perform operations such as, but not limited to, receiving, storing, converting, queuing and transmitting SMS messages. To provide a general example, when a remote endpoint (e.g., another UE, a server, etc.) transmits a SMS message to the UE 110, the SMS message may initially be delivered to the SMSSC 170. Subsequently, the SMSSC 170 may store and forward the message to the UE 110 when the UE 110 is available. The network arrangement 100 shows the SMSSC 170 directly connected to the cellular core network 130. However, this is merely provided for illustrative purposes, the SMSSC 170 may be connected directly to the 5G NR-RAN 120 or any other appropriate network component or may be a component and/or function of the cellular core network 130 or the 5G NR-RAN 120.

Figure 2:
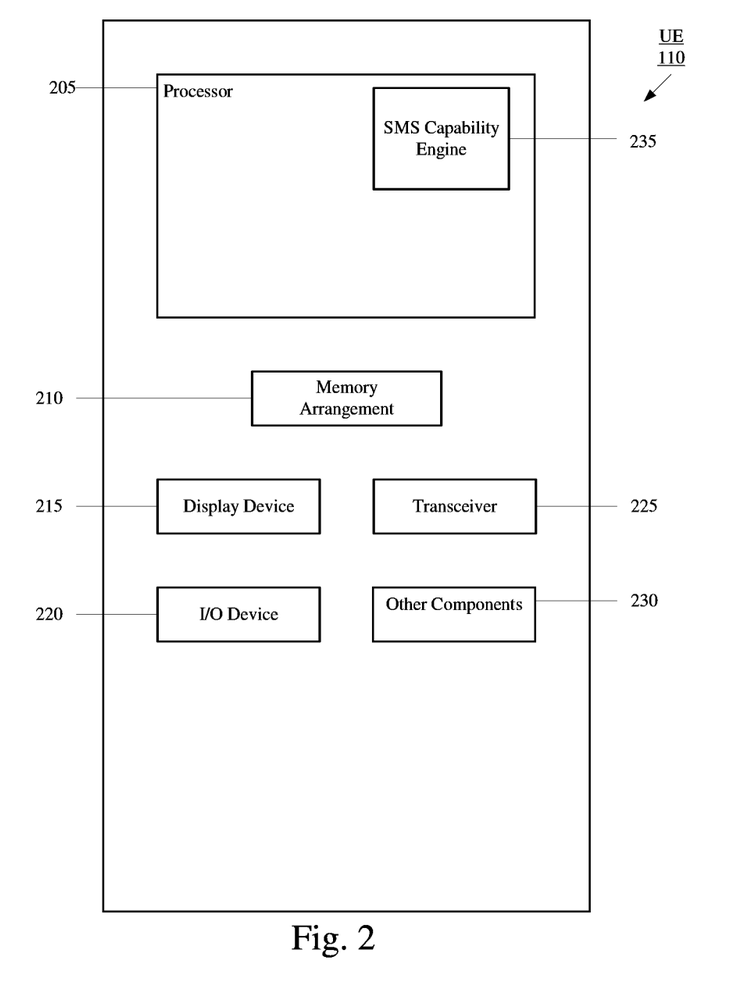
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, an antenna panel 230 and other components 235. The other components 235 may include, for example, a SIM card, an embedded SIM (eSIM), an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include an SMS capability engine 235. The SMS capability engine 235 may manage communications between the UE 110 and the network related to providing the network with an indication of the type of SMS messages that are supported or not supported by the UE 110.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

Figure 3:
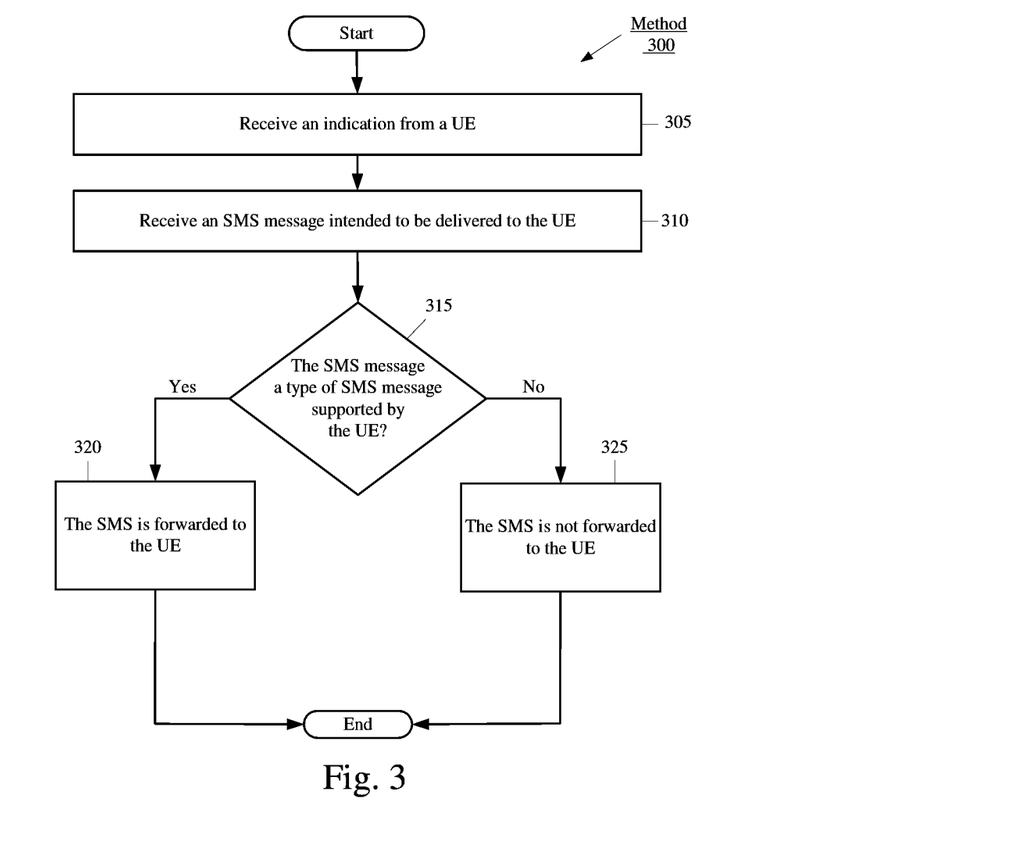
FIG. 3 shows a method for a network component to prevent the UE from receiving a type of SMS message the UE does not support according to various exemplary embodiments.

FIG. 3 shows a method 300 for a network component to prevent the UE 110 from receiving a type of SMS message the UE 110 does not support according to various exemplary embodiments. The method 300 will be described with regard to the network arrangement 100 of FIG. 1 and the UE 110 of FIG. 2.

The method 300 is described with regard to operations performed by a single network component. However, this is only provided for illustrative purposes, these operations may be performed by multiple network components. Further, the exemplary embodiments are not limited to these operations being performed by any particular network component. For example, in this example the network component may represent the SMSSC 170, the gNB 120A, a network function (e.g., access and mobility management function (AMF), etc.), a gateway, a server, a mobile management entity (MME), a protocol stack layer, the IMS 150 or any other appropriate network component.

In 305, the network component receives an indication from the UE 110. The indication may be received directly or indirectly from the UE 110 and indicate the type of SMS messages that the UE 110 supports and/or the type of SMS messages that the UE 110 does not support. As will explained in more detail below, this indication may be provided in a variety of different ways. For instance, the indication may be provided by the UE 110 in a network registration request, in a response to reception of a type of SMS message the UE 110 does not support, as part of IMS registration and/or as part of the SMS relay protocol (SMS-RP). However, any reference to the network component receiving this indication in any particular manner is only provided for illustrative purposes, the exemplary embodiments may apply to the network component receiving this indication in any appropriate manner.

In 310, the network component receives a SMS message that is intended to be delivered to the UE 110. In 315, the network component determines whether the SMS message is a type of SMS supported by the UE 110 based on the indication. If the SMS message is supported by the UE 110, the method 300 continues to 320. In 320, the SMS message is forwarded to the UE 110. Subsequently, the method 300 ends.

Returning to 315, if the SMS message is not supported by the UE 110, the method 300 continues to 325. In 325, the network component does not forward the SMS message to the UE 110. This may include filtering the SMS message, discarding the SMS message or any other appropriate operation that may prevent the SMS message from being delivered to the UE 110. In some embodiments, the network component may directly or indirectly notify the sender of the SMS message that the intended recipient, the UE 110, does not support this type of SMS message.

As mentioned above, the UE 110 may indicate to a network component the type of SMS messages the UE 110 supports in a network registration request. To provide an example, the UE 110 may be camped on the gNB 120A and perform a random access procedure. Subsequently, the UE 110 and the gNB 120A may participate in a signaling exchange to establish a radio resource control (RRC) connection with the gNB 120A. The UE 110 then sends a network registration request to the network via the gNB 120A. The network registration request may be configured to include an information element (IE) that indicates the type of SMS messages the UE 110 supports. A portion of an exemplary IE is described below with regard to FIG. 4. This indication may be used by the network to prevent types of SMS messages the UE 110 does not support from being delivered to the UE 110.

In response to the network registration request, the UE 110 may receive a network registration accept. In some embodiments, the network registration accept may include an indication that the network is configured to prevent the UE 110 from receiving one or more types of SMS messages. For example, the network registration accept may include an IE that indicates the types of SMS messages that are to be filtered by the network. If the registration accept does not include this indication, the UE 110 may assume that the network is preventing types of SMS messages the UE 110 does not support from being delivered to the UE 110. Alternatively, if the registration accept does not include this indication, the UE 110 may assume that the network is not filtering SMS messages on behalf of the UE 110. In some embodiments, this may cause the UE 110 to preemptively initiate a different filtering technique.

Figure 4:
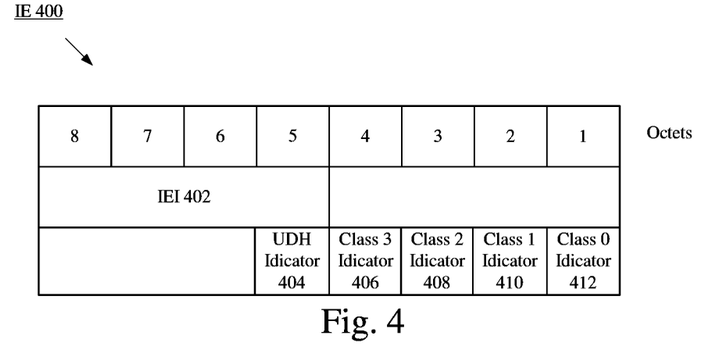
FIG. 4 shows an exemplary IE that is included in a network registration request according to various exemplary embodiments.

FIG. 4 shows an exemplary IE 400 that is included in a network registration request according to various exemplary embodiments. The IE 400 is shown as being 8 octets long and including multiple portions. However, the IE 400 is not intended to limit the exemplary embodiments in any way. An actual IE may be any appropriate length, include more or less information and convey its contents in any appropriate manner.

The IE 400 includes an information element identifier (IEI) 402, a UDH indicator 404, a class 3 indicator 406, a class 2 indicator 408, a class 1 indicator 410 and a class 0 indicator 412. The IEI 402 may identify that the IE 400 includes an indication of the types of SMS messages the UE 110 supports.

When the UDH indicator 404 is set to a first value (e.g., 1, 0, etc.), this indicates that the UE 110 supports a SMS message that includes a UDH. When the UDH indicator 404 is set to a second value, this indicates that the UE 110 does not support a SMS message that includes a UDH. When the class 3 indicator 406 is set to a first value (e.g., 1, 0, etc.), this indicates that the UE 110 supports a class 3 SMS message. When the class 3 indicator 406 is set to a second value, this indicates that the UE 110 does not support a class 3 SMS message. When the class 2 indicator 408 is set to a first value (e.g., 1, 0, etc.), this indicates that the UE 110 supports a class 2 SMS message. When the class 2 indicator 408 is set to a second value, this indicates that the UE 110 does not support a class 2 SMS message. When the class 1 indicator 410 is set to a first value (e.g., 1, 0, etc.), this indicates that the UE 110 supports a class 1 SMS message. When the class 1 indicator 410 is set to a second value, this indicates that the UE 110 does not support a class 1 SMS message. When the class 0 indicator 412 is set to a first value (e.g., 1, 0, etc.), this indicates that the UE 110 supports a class 0 SMS message. When the class 0 indicator 412 is set to a second value, this indicates that the UE 110 does not support a class 0 SMS message. In some embodiments, the priority of the UDH bit may supersede the priority of the class 0, class 1, class 2 and class 3 bits. That is, in some embodiments, if the UDH bit is set, the UE 110 and the network may choose to ignore the class bits.

The exemplary IE 400 is not required to use a first value and a second value to provide an indication to the network and may provide the indication in any appropriate manner. Further, to ensure backwards compatibility, if the IE 400 is not populated, the network may assume that the UE 110 supports all types of SMS messages.

As mentioned above, the indication may be provided by the UE 110 to the network in a response to the reception of a type of SMS message the UE 110 does not support. For example, in accordance with the SMS protocol, when an issue occurs with a received SMS message, the UE 110 may be configured to respond to the network with a relay protocol error (RP-ERROR) that includes a cause code. An indication of the type of SMS message the UE 110 supports and/or does not support may be included as a cause code. Subsequently, the network may prevent one or more types of SMS messages from being delivered to the UE 110 based on the cause code included in the RP-ERROR. However, reference to the RP-ERROR is only provided for illustrative purposes. The exemplary embodiments may apply to this indication being included in any type of signal sent to the network by the UE 110 after the reception of a type of SMS message the UE 110 does not support.

To provide an example, consider the following exemplary scenario in which the UE 110 does not support a class 0 SMS message. Initially, the UE 110 receives the class 0 SMS message via the currently camped cell. At the UE 110, various protocol stack layers process the SMS message and then it is determined that the SMS message is a class 0 SMS message, e.g., a type of SMS message the UE 110 does not support. In response, the UE 110 generates an RP-ERROR that includes a cause code indicating that class 0 SMS messages are not supported by the UE 110. The RP-ERROR is then sent to the network and may provide the basis for the network preventing subsequent class 0 SMS messages from being delivered to the UE 110.

As mentioned above, the indication may also be provided by the UE 110 to the network during IMS registration. For example, to access internet protocol (IP) based services, the UE 110 may register with the IMS 150. This may include a session initiation protocol (SIP) registration procedure. The indication corresponding to which type of SMS message the UE 110 supports and/or does not support may be included in the SIP registration procedure as a time-length-value (TLV) element. This ensures that the IMS 150 and/or cellular core network 130 are aware of the types of SMS messages that the UE 110 does not support. The exemplary embodiments are not limited to providing the indication in the SIP registration procedure in any particular way; the indications may be provided in the SIP registration procedure in any appropriate manner. To provide an example of how the indications may be provided, an exemplary portion of the XML that may be included in the SIP registration procedure has been provided below.

Example XML that May be Included in the REGISTER Request:

```
Content-Type: application/3gpp-ims+xml
Content-Length: (...)
<?xml version="1.0" encoding="UTF-8"?>
<ims-3gpp version="2">
    <sms-unsupported>class-0</sms-unsupported>
    <sms-unsupported>udh</sms-unsupported>
</ims-3gpp>
```

XML Schema Extension:

```
<?xml version="1.0" encoding="UTF-8"?>
<xs:schema
    targetNamespace="urn:3gpp:ns:extRegInfo:1.0"
    xmlns:xs="http://www.w3.org/2001/XMLSchema"
    elementFormDefault="qualified"
    attributeFormDefault="unqualified">
<xs:element name="sms-unsupported">
    <xs:simpleType>
        <xs:restriction base="xs:string">
            <xs:enumeration value="class-0"/>
            <xs:enumeration value="class-1"/>
            <xs:enumeration value="class-2"/>
            <xs:enumeration value="class-3"/>
            <xs:enumeration value="udh"/>
        </xs:restriction>
    </xs:simpleType>
</xs:element>
```

As mentioned above, the indication may also be provided by the UE 110 as part of the SMS-RP. In accordance with the SMS-RP, the UE 110 may send messages for short message and notification transfer on the short message relay layer (SM-RL). These types of messages include RP short message memory available (RP-SMMA), RP acknowledgment (RP-ACK) and RP-ERROR. The exemplary embodiments relate to implementing a similar type of message that is configured as a request to the network component (e.g., the SMSC, etc.) indicating types of SMS messages the UE 110 supports and/or does not support. This request may provide the basis for the network component preventing SMS messages the UE 110 does not support from being provided to the UE 110. Throughout this description this procedure may be referred to as an "RP-SMS-TYPE-SUPPORT procedure" and the message may be referred to as a "RP-SMS-TYPE-SUPPORT-REQ." However, reference to a RP-SMS-TYPE-SUPPORT procedure and a RP-SMS-TYPE-SUPPORT-REQ are only provided for illustrative purposes. Different entities may refer to similar concept by a different name.

To provide an example, the RP-SMS-TYPE-SUPPORT-REQ may be encoded as a TLV element and indicate to the SMSC the UE 110 capabilities in terms of the types of SMS supported by the UE 110. The RP-SMS-TYPE-SUPPORT-REQ may include a UDH indicator corresponding to whether the UE 110 supports SMS messages that include UDH, a class 3 indicator corresponding to whether the UE 110 supports class 3 SMS messages, a class 2 indicator corresponding to whether the UE 110 supports class 2 SMS messages, a class 1 indicator corresponding to whether the UE 110 supports class 1 SMS messages and a class 0 indicator corresponding to whether the UE 110 supports class 2 SMS messages.

When the UDH indicator is set to a first value (e.g., 1, 0, etc.), this indicates that the UE 110 supports a SMS message that includes a UDH. When the UDH indicator is set to a second value, this indicates that the UE 110 does not support a SMS message that includes a UDH. When the class 3 indicator is set to a first value (e.g., 1, 0, etc.), this indicates that the UE 110 supports a class 3 SMS message. When the class 3 indicator is set to a second value, this indicates that the UE 110 does not support a class 3 SMS message. When the class 2 indicator is set to a first value (e.g., 1, 0, etc.), this indicates that the UE 110 supports a class 2 SMS message. When the class 2 indicator is set to a second value, this indicates that the UE 110 does not support a class 2 SMS message. When the class 1 indicator is set to a first value (e.g., 1, 0, etc.), this indicates that the UE 110 supports a class 1 SMS message. When the class 1 indicator is set to a second value, this indicates that the UE 110 does not support a class 1 SMS message. When the class 0 indicator is set to a first value (e.g., 1, 0, etc.), this indicates that the UE 110 supports a class 0 SMS message. When the class 0 indicator is set to a second value, this indicates that the UE 110 does not support a class 0 SMS message.

The above description of the RP-SMS-TYPE-SUPPORT-REQ is only provided for illustrative purposes and is not intended to limit the exemplary embodiments in any way. An actual RP-SMS-TYPE-SUPPORT-REQ may include more or less information and convey its contents in any appropriate manner.

The RP-SMS-TYPE-SUPPORT-REQ may be implemented with a corresponding response message. Throughout this description the response message may be referred to as "RP-SMS-TYPE-SUPPORT-RSP." The RP-SMS-TYPE-SUPPORT-RSP may be encoded as a TLV element and indicate to the UE 110 that the network is to prevent one or more types of SMS messages from being provided to the UE 110. Like the RP-SMS-TYPE-SUPPORT-REQ, the RP-SMS-TYPE-SUPPORT-RSP may set bits to a first value to indicate that a type of SMS message is to be filtered and bits to a second value to indicate that a type of SMS is not to be filtered. If the network does not support filtering of certain types of SMS messages, no RP-SMS-TYPE-SUPPORT-RSP may be provided to the network or all the bits may be set to the second value.

In some embodiments, if a RP-SMS-TYPE-SUPPORT-RSP is not received in response to a RP-SMS-TYPE-SUPPORT-REQ, the UE 110 may assume that the filtering is to be performed. In other embodiments, if a RP-SMS-TYPE-SUPPORT-RSP is not received in response to a RP-SMS-TYPE-SUPPORT-REQ, the UE 110 may interpret the lack of RP-SMS-TYPE-SUPPORT-RSP as indicating that the network does not support this type of filtering.

Alternatively, instead of a RP-SMS-TYPE-SUPPORT-RSP, the network may respond to a RP-SMS-TYPE-SUPPORT-REQ with an RP-ERROR. In this type of scenario, the RP-ERROR may be interpreted by the UE 110 as an indication that filtering is not supported by the network. Further, instead of a RP-SMS-TYPE-SUPPORT-RSP, the network may respond to a RP-SMS-TYPE-SUPPORT-REQ with an RP acknowledgment (RP-ACK). The RP-ACK may be interpreted by the UE 110 as the acceptance of the filtering request and assume that the filtering is to be performed.

To provide an example of a filtering procedure using the messages described above, consider the following exemplary scenario. The UE 110 may initiate a filtering procedure which explicitly requests the network to filter certain types of SMS messages from being provided to the UE 110. This may include the UE 110 sending a RP-SMS-TYPE-SUPPORT-REQ to the network indicating which types of SMS messages are supported and/or not supported by the UE 110. The network may use this information to apply a filter to any incoming SMS packet data units (PDUs) intended for the UE 110. However, not all types of SMS messages may be filtered on the network side. Thus, the network may send the UE 110 a RP-SMS-TYPE-SUPPORT-RSP which may indicate which types of SMS messages are to be filtered by the network.

The exemplary embodiments may also relate to the UE 110 indicating to the network UE 110 capabilities corresponding to emergency SMS messages. Throughout this description, an "emergency SMS message" may refer to any type of SMS message that is to be utilized for emergency services (e.g., fire, police, medical assistance, etc.). Emergency SMS messages may be further characterized based on the initiating device, the terminating device and/or the contents (e.g., information and/or data). Throughout this description an "E1 SMS message" may refer to an emergency SMS message initiated by the UE 110. An "E2 SMS message" may refer to an emergency SMS message terminating at the UE 110 and sent from an endpoint such as a public safety answer point (PSAP) or similar entity. An "E3 SMS message" may refer to an emergency SMS message used for location purposes such as advanced mobile location (AML). However, reference to "emergency SMS message," "E1 SMS message," "E2 SMS message" and "E3 SMS message" are only for illustrative purposes. Different entities may refer to similar concepts by a different name.

Like the other indications described herein (e.g., UDH, class 3, class 2, class 1, class 0), the UE 110 may also provide the network with one or more indications corresponding to emergency SMS message capabilities. These indications may be provided to ensure that the network does not filter emergency SMS messages corresponding to the UE 110. Thus, in some embodiments, indications corresponding to emergency SMS message capabilities may be provided to the network when the other indications described herein are provided (e.g., in a network registration message, during IMS registration, in a RP-SMS-TYPE-SUPPORT-REQ, any other appropriate type of message in the SMS-RP, during a RP-SMS-TYPE-SUPPORT procedure, etc.). In other embodiments, indications corresponding to emergency SMS message capabilities may be provided independently from the other indications described herein using a separate procedure. The UE 110 being able to specify emergency SMS message capabilities provides the UE 110 with a mechanism to request that all other types of SMS messages are filtered. This allows the UE 110 to comply with various regulations and/or standards-based requirements (e.g., emergency SMS connectivity) without being vulnerable to the power drain and/or security risk of other types of SMS messages that are not supported by the UE 110.

The UE 110 may be configured to provide the indications described herein at any appropriate time. For example, the UE 110 may trigger a RP-SMS-TYPE-SUPPORT procedure to dynamically enable/disable the filtering of certain types of SMS messages. Therefore, on the network side, in some embodiments, a filter implemented on behalf of the UE 110 may remain until a subsequent RP-SMS-TYPE-SUPPORT procedure is performed. In this type of configuration, even attach and detach procedures may not change the filters on the network side.

In some embodiments, the network may utilize one or more timers to manage the filters implemented on behalf of the UE 110. For example, the network may initiate a timer when a filter corresponding to the UE 110 is implemented and when the timer expires the network may remove the corresponding filter. The value of the timer may be based on one or more factors including, but not limited to, a type of SMS message, a negotiation between the UE 110 and the network, the carrier, a combination thereof, etc.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
  a transceiver configured to communicate with a network; and
  a processor communicatively coupled to the transceiver and configured to perform operations comprising:
    registering with the network;
    transmitting, to the network, an indication of one or more types of short message service (SMS) messages that are not supported by the UE, wherein the indication is transmitted on a short message relay layer (SM-RL) between the UE and the network; and
    receiving, from the network via the SM-RL, a second indication identifying types of SMS messages that the network is filtering for the UE.

2. The UE of claim 1, wherein the indication comprises an information element (IE) indicating the one or more types of SMS messages that are not supported by the UE and one or more types of SMS messages supported by the UE.

3. The UE of claim 2, wherein the indication is transmitted as part of a network registration request.

4. The UE of claim 3, wherein the operations further comprise:
  receiving, from the network in response to the network registration request, a network registration accept message comprising a second indication that the network is configured to prevent the UE from receiving the one or more types of SMS messages.

5. The UE of claim 1, wherein the one or more types of SMS messages comprise a class 0 message, a class 1 message, a class 2 message, a class 3 message, a SMS message configured with a user data header (UDH) or a wireless application protocol (WAP) push message.

6. The UE of claim 1, wherein the operations further comprise:
  receiving, from the network, a first SMS message;
  partially processing the first SMS message to determine the first SMS message has a type corresponding to the one or more types of SMS messages not supported by the UE; and
  transmitting, to the network, an error message comprising the indication.

7. The UE of claim 6, wherein the indication comprises a cause code indicating the UE does not support the type of the first SMS message.

8. The UE of claim 1, wherein the operations further comprise:
  registering with an IP Multimedia Subsystem (IMS) of the network, wherein the registering includes transmitting the indication.

9. The UE of claim 8, wherein the registering includes a session initiation protocol (SIP) registration procedure comprising a time-length-value (TLV) element that includes the indication.

10. A processor configured to perform operations comprising:
  registering with a network;
  transmitting, to the network, an indication of one or more types of short message service (SMS) messages that are not supported by a UE, wherein the indication is transmitted on a short message relay layer (SM-RL) between the UE and the network; and
  receiving, from the network via the SM-RL, a second indication identifying types of SMS messages that the network is filtering for the UE.

11. The processor of claim 10, wherein the indication comprises an information element (IE) indicating the one or more types of SMS messages that are not supported by the UE and one or more types of SMS messages supported by the UE, wherein the indication is transmitted as part of a network registration request.

12. The processor of claim 10, wherein the operations further comprise:
  receiving, from the network, a first SMS message;
  partially processing the first SMS message to determine the first SMS message has a type corresponding to the one or more types of SMS messages not supported by the UE; and
  transmitting, to the network, an error message comprising the indication, wherein the indication comprises a cause code indicating the UE does not support the type of the first SMS message.

13. The processor of claim 10, wherein the operations further comprise:
  registering with an IP Multimedia Subsystem (IMS) of the network, wherein the registering includes transmitting the indication, the registering including a session initiation protocol (SIP) registration procedure comprising a time-length-value (TLV) element that includes the indication.

\* \* \* \* \*